H. S. FRANK.
MACHINE FOR MANUFACTURING PISTON RINGS.
APPLICATION FILED JULY 1, 1918.
1,345,000.
Patented June 29, 1920.
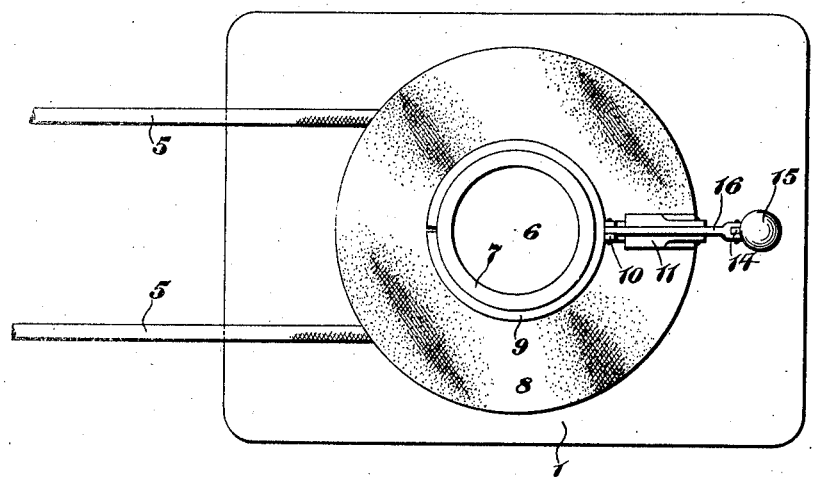
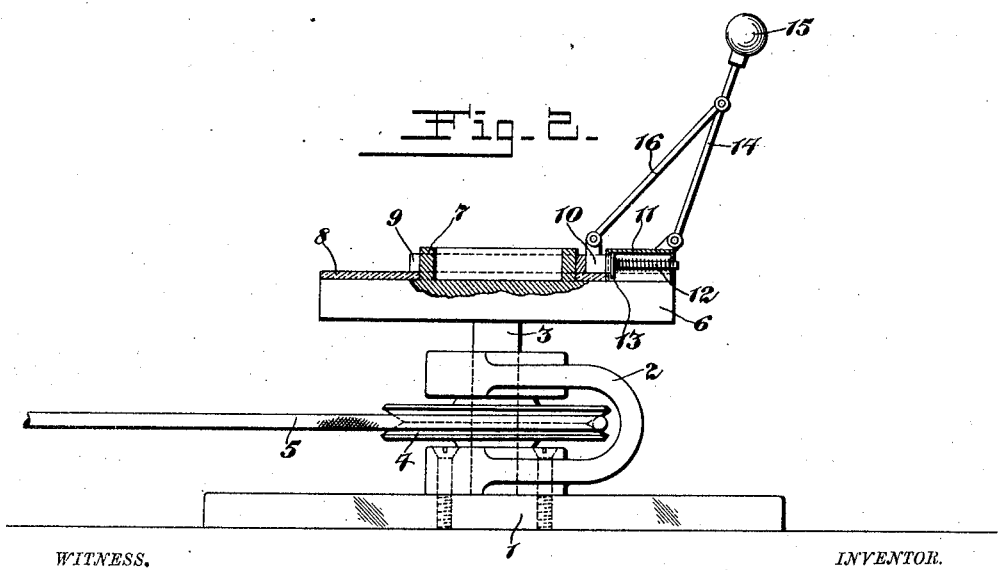
WITNESS.
Charles A. Becker
INVENTOR.
Harry S. Frank,
BY Rippey Kingsland,
HIS ATTORNEYS.

UNITED STATES PATENT OFFICE.

HARRY S. FRANK, OF ST. LOUIS, MISSOURI.

MACHINE FOR MANUFACTURING PISTON-RINGS.

1,345,000. Specification of Letters Patent. Patented June 29, 1920.

Application filed July 1, 1918. Serial No. 242,718.

*To all whom it may concern:*

Be it known that I, HARRY S. FRANK, a citizen of the United States, residing at the city of St. Louis and State of Missouri, have invented a new and useful Machine for Manufacturing Piston-Rings, of which the following is a specification.

This invention relates to machines for manufacturing piston rings.

An object of the invention is to provide a machine for treating piston rings whereby the rings are so shaped and characterized that when they are compressed within the cylinders for which they are intended they will impart uniform pressure against the surfaces of the cylinders throughout the circumference of the rings.

Another object of the invention is to provide a machine for subjecting a split piston ring to uniform radial pressure throughout its circumference in order to give the ring a shape and quality of resilience so that when the ring is compressed within the cylinder it will press properly against the cylinder wall throughout the circumference of the ring.

In the accompanying drawing, in which I have illustrated preferred form of the invention, Figure 1 is a plan view of the machine with a piston ring thereon for treatment.

Fig. 2 is a side elevation of the machine with parts thereof in section.

The present invention comprises a machine for manufacturing piston rings according to the method and mode of procedure disclosed in an application for process of manufacturing piston rings, filed concurrently herewith and having Serial Number 242,719.

In the machine illustrated the base 1 is rigidly located and supports a bracket 2 provided with bearings in which a shaft 3 is journaled. The shaft 3 is intended to be rotated rapidly by any appropriate driving connections as, for instance, by a sheave or pulley 4 and a belt or cable 5.

A supporting table in the form of a disk 6 is secured to the upper end of the shaft 3 and is provided on its upper surface with an annular flange 7 which is concentric with the axis of the shaft 3. The upper surface of the table 6 is covered by a layer 8 of heat insulating material so that the rings supported thereon around the flange 7 may be heated without subjecting the table 6 or the shaft 3 to the direct influence of the heat.

A piston ring 9 is shown around the flange 7 so that the piston ring is thereby held in a position which is concentric with the axis of the table 6 and of the shaft 3. While the piston ring is mounted on the table around the flange 7 the driving mechanism is set in operation so that the table 6 is rapidly revolved, thus subjecting the split piston ring thereon to the influence of centrifugal pressure or force throughout the circumference of the ring. The outward radial pressure of the centrifugal force is uniform at every point throughout the circumference of the ring, so that the shape of the ring is changed by the radial pressures applied thereto as a result of the rapid revolution of the ring. While the ring is being rapidly revolved and is in its changed shape it may be subjected to heat so that the molecular arrangement will be modified and the material set in the shape given thereto by the centrifugal forces.

To retain the ring properly in connection with the table during the preliminary or starting movements of the table and also during the period that the speed of rotation is being reduced, I provide a pressure device to engage the ring and which acts automatically to relieve pressure from the ring when the desired speed of rotation is attained. The pressure device includes an element 10 supported radially within a case 11 in connection with the table. A spring 12 encircles the element 10 within the case having one end abutting against the outer end of the case and the opposite end abutting against a collar 13 in connection with the pressure element. In this manner the element 10 is actuated inwardly, the inner end thereof being arranged to impart pressure against the piston ring and to hold the same in proper position upon the table during initial and final stages of operation. However, it is desired to remove the pressure of the element 10 from the piston ring at the proper time in order to permit the centrifugal forces to impart uniform outward radial pressure against every point of the ring. This is accomplished by a device specially provided for that purpose including an actuator comprising an arm 14 having one end pivoted to the case 11; a weight 15 on the opposite end of the arm, and a link 16 connecting the arm with the pressure element 10. It is obvious that this device under the influence of centrifugal force will draw the pressure element 10 outwardly in opposition to the spring 12, and thus remove the pressure of said element from the piston ring and leave the ring free to be affected by the centrifugal force.

The machine is simple and efficient in construction and operation and produces a piston ring of novel characteristics and qualities. It will be understood that I do not restrict myself to unessential features of construction and arrangement, but that I contemplate all modified and equivalent structures which are within the scope of the appended claims.

I claim:

1. A machine operative to change the form of piston rings by centrifugal pressure, comprising a support constructed and arranged to support a piston ring, and to change the shape of the piston ring by centrifugal pressure throughout the circumference of the ring, an annular flange concentric with the axis of the support, an element arranged to press the piston ring into contact with said flange, a spring for actuating said element to press the ring against said flange, a centrifugal device for actuating said element to position to prevent pressure of said element against the ring during the time that the shape of the ring is being changed by centrifugal pressure, and means for revolving the support as required to change the shape of the piston ring thereon by centrifugal pressure.

2. A machine operative to change the form of piston rings by centrifugal pressure, comprising a support constructed and arranged to support a piston ring and to change the shape of the piston ring by centrifugal pressure throughout the circumference of the ring, a device for holding a piston ring concentrically upon said support, and means for revolving the support as required to change the shape of the piston ring thereon by centrifugal pressure.

3. A machine operative to change the form of piston rings by centrifugal pressure, comprising a support constructed and arranged to support a piston ring and to change the shape of the piston ring by centrifugal pressure throughout the circumference of the ring, a device for holding a piston ring concentrically upon said support, and means for revolving the support as required to change the shape of the piston ring thereof by centrifugal pressure.

4. A machine for treating piston rings, comprising a revoluble support for subjecting the piston rings to centrifugal forces, a layer of heat insulating material for supporting the rings on said support, and means whereby the piston rings may be positioned concentrically relative to the support.

5. A machine of the character described, comprising a support arranged to support a piston ring and to change the shape thereof by centrifugal pressure, a device for positioning the rings concentrically upon the support, a device for holding a piston ring upon the support, and means for operating said support as required to change the shape of a piston ring on the support by centrifugal pressure.

6. A machine of the character described, comprising a revoluble support for subjecting piston rings to centrifugal force, a device for holding a piston ring concentrically upon said support, a pressure device for preventing displacement of the piston ring during the initial and final movements of the support, and means for preventing pressure of said device against the piston ring during a part of the rotation of said support.

HARRY S. FRANK.